(12) United States Patent
Bonwick et al.

(10) Patent No.: US 7,657,671 B2
(45) Date of Patent: Feb. 2, 2010

(54) ADAPTIVE RESILVERING I/O SCHEDULING

(75) Inventors: Jeffrey S. Bonwick, Los Altos, CA (US); William H. Moore, Fremont, CA (US); Matthew A. Ahrens, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 525 days.

(21) Appl. No.: 11/406,757

(22) Filed: Apr. 19, 2006

(65) Prior Publication Data

US 2007/0168569 A1    Jul. 19, 2007

Related U.S. Application Data

(60) Provisional application No. 60/733,909, filed on Nov. 4, 2005.

(51) Int. Cl.
  G06F 12/00 (2006.01)
  G06F 13/00 (2006.01)
  G06F 13/28 (2006.01)
(52) U.S. Cl. .................................. 710/40; 711/100
(58) Field of Classification Search .................. 711/112
  See application file for complete search history.

(56) References Cited

U.S. PATENT DOCUMENTS

| | | | |
|---|---|---|---|
| 5,129,085 A | | 7/1992 | Yamasaki et al. |
| 5,274,803 A | | 12/1993 | Dubin et al. |
| 5,403,639 A | | 4/1995 | Belsan et al. |
| 5,410,667 A | | 4/1995 | Belsan et al. |
| 5,675,802 A | | 10/1997 | Allen et al. |
| 5,680,539 A | * | 10/1997 | Jones .............................. 714/6 |
| 5,761,501 A | | 6/1998 | Lubbers et al. |
| 5,787,482 A | * | 7/1998 | Chen et al. .................. 711/158 |
| 5,812,799 A | | 9/1998 | Zuravleff et al. |
| 5,878,280 A | | 3/1999 | Lucht |
| 5,937,205 A | * | 8/1999 | Mattson et al. ................. 710/6 |
| 6,023,720 A | * | 2/2000 | Aref et al. .................... 718/103 |
| 6,078,998 A | * | 6/2000 | Kamel et al. ................. 711/151 |
| 6,341,341 B1 | | 1/2002 | Grummon et al. |
| 6,378,036 B2 | | 4/2002 | Lerman et al. |

(Continued)

OTHER PUBLICATIONS

Sandberg, R. et al.; "Design and Implementation of the Sun Network Filesystem"; Sun Microsystems, Inc., 1985 USENIX Conference (12 pages).

(Continued)

*Primary Examiner*—Matt Kim
*Assistant Examiner*—Matthew R Chrzanowski
(74) *Attorney, Agent, or Firm*—Osha • Liang LLP

(57) ABSTRACT

In general, the invention relates to a method for storing data. The method includes receiving an Input/Output (I/O) request to store data in a storage pool, determining whether the I/O request is a resilvering I/O request, if the I/O request is a resilvering I/O request: associating the I/O request with a first deadline, wherein the first deadline is associated with a low priority, and determining the quantized deadline for the I/O request using the first deadline. If the I/O request is not the resilvering I/O request: associating the I/O request with a second deadline, determining the quantized deadline for the I/O request using the second deadline, placing the I/O request in the I/O queue using the quantized deadline, and issuing the I/O request to the storage pool using the I/O queue.

15 Claims, 6 Drawing Sheets

U.S. PATENT DOCUMENTS

| | | | |
|---|---|---|---|
| 6,490,611 B1 * | 12/2002 | Shen et al. | 718/103 |
| 6,502,205 B1 | 12/2002 | Yanai et al. | |
| 6,536,033 B1 | 3/2003 | Weerawarana et al. | |
| 6,745,262 B1 * | 6/2004 | Benhase et al. | 710/40 |
| 6,795,966 B1 | 9/2004 | Lim et al. | |
| 6,820,098 B1 | 11/2004 | Ganesh et al. | |
| 6,829,617 B2 | 12/2004 | Sawdon et al. | |
| 6,857,001 B2 | 2/2005 | Hitz et al. | |
| 6,871,011 B1 * | 3/2005 | Rahman et al. | 386/125 |
| 6,892,211 B2 | 5/2005 | Hitz et al. | |
| 6,947,450 B2 | 9/2005 | Mangin et al. | |
| 7,039,661 B1 | 5/2006 | Ranade et al. | |
| 7,100,074 B2 | 8/2006 | Watanabe et al. | |
| 7,114,156 B2 | 9/2006 | Le et al. | |
| 7,133,964 B2 | 11/2006 | Rodrigues et al. | |
| 7,162,486 B2 | 1/2007 | Patel et al. | |
| 7,174,352 B2 | 2/2007 | Kleiman et al. | |
| 7,200,715 B2 * | 4/2007 | Kleiman et al. | 711/114 |
| 7,260,703 B1 * | 8/2007 | Moore et al. | 711/203 |
| 7,340,640 B1 | 3/2008 | Karr et al. | |
| 2002/0066050 A1 * | 5/2002 | Lerman et al. | 714/6 |
| 2002/0161972 A1 | 10/2002 | Talagala et al. | |
| 2003/0084242 A1 | 5/2003 | Strange et al. | |
| 2003/0177322 A1 | 9/2003 | Crockett et al. | |
| 2003/0177324 A1 | 9/2003 | Timpanaro-Perrotta | |
| 2003/0191876 A1 | 10/2003 | Fallon | |
| 2004/0024973 A1 | 2/2004 | Chron et al. | |
| 2004/0030822 A1 | 2/2004 | Rajan et al. | |
| 2004/0143713 A1 | 7/2004 | Niles et al. | |
| 2004/0268068 A1 | 12/2004 | Curran et al. | |
| 2005/0010620 A1 | 1/2005 | Silvers et al. | |
| 2005/0044289 A1 * | 2/2005 | Hendel et al. | 710/33 |
| 2005/0235154 A1 | 10/2005 | Serret-Avila | |
| 2006/0168409 A1 | 7/2006 | Kahn et al. | |
| 2006/0218644 A1 | 9/2006 | Niles et al. | |
| 2006/0256965 A1 | 11/2006 | Rowe | |
| 2007/0101058 A1 * | 5/2007 | Kinnan et al. | 711/114 |
| 2008/0010580 A1 * | 1/2008 | Anderson et al. | 714/763 |

OTHER PUBLICATIONS

McKusick, M. K. et al.; "A Fast File System for UNIX"; ACM Transaction on Computer Systems, vol. 2, No. 3, Aug. 1984, pp. 181-197 (17 pages).

Astrahan, M.M. et al.; "System R: Relational Approach to Database Management"; ACM Transactions on Database Systems, vol. 1, No. 2, Jun. 1976, pp. 97-137 (41 pages).

"Veritas File System 3.4 Administrator's Guide" Veritas Software Corporation, Nov. 2000, http://www.veritas.com; pp. 1-227 (227 pages).

Czezatke C. et al.; "Linlogfs: A Log-Structured Filesystem for Linux"; The USENIX Association, Proceedings of FREENIX Track: 2000 USENIX Annual Technical Conference, San Diego, California, Jun. 18-23, 2000 (13 pages).

Osorio, N. et al.; "Guidelines for Using Snapshot Storage Systems for Oracle Databases"; Oracle Corporation, Oct. 2001 (13 pages).

Quinlan, S.; "A Cached Worm File System"; AT&T Bell Laboratories, Murry Hill, New Jersey; Software-Practice and Experience, vol. 21(12), pp. 1289-1299, Dec. 1991 (11 pages).

Sun StorEdge Instant Image 2.0 System Administrators Guide; Sun Microsystems, Inc., Feb. 2000, Revision A (106 pages).

Ylonen, T.; "Concurrent Shadow Paging: A New Direction for Database Research"; Laboratory of Information Processing Science, Helsinki University of Technology, SF-02150, Espoo, Finland, 1992 (8 pages).

Popek, G. et al.; "The Locus Distributed System Architecture"; The MIT Press, Cambridge, Massachusetts, 1985 The Massachusetts Institute of Technology (8 pages).

Gray, J. et al.; "The Recovery Manager of the System R Database Manager"; Computing Surveys, vol. 13, No. 2, Jun. 1981 (20 pages).

Schilling, J.; "Enrwurf und Implementierung eines schnellen Filesystems fur Unix unter besonderer Berucksichtigung der technischen Parameter optischer Speichermedien und multimedialer Anwendungen"; Diplomarbeir Jorg Schilling, eingereicht am 23.05.1991 an der Tu Berlin, and English Translation (245 pages).

Ylonen, T.; "Concurrent Shadow Paging: Snapshots, Read-Only Transactions, and On-The-Fly Multi-Level Incremental Dumping"; Laboratory of Information Processing Science, Helsinki University of Technology, FIN-02150, Espoo, Finland, 1993 (22 pages).

"The Enterprise Challenge Served by Snapshot"; Whitepaper, 2001 LSI Logic Corporation (8 pages).

Agrawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 pages).

Suresh, Babu S.; "Persistent Snapshots"; Department of Computer Science and Automation, Indian Institute of Science, Bangalore—560 012, Jan. 2000 (38 pages).

"Proceedings of the 5th Annual Linux Showcase & Conference" USENIX Association, Oakland, California, Nov. 5-10, 2001 (11 pages).

Borg, A. et al.; "Fault Tolerance Under UNIX"; ACM Transactions on Computer Systems, vol. 7, No. 1, Feb. 1989, pp. 1-24 (24 pages).

Rosenblum, M. et al.; "The Design and Implementation of a Log-Structured File System"; Electrical Engineering and Computer Sciences, Computer Science Division, Univeristy of California, 1991 (15 pages).

Hecht, M. S. et al.; "Shadowed Management of Free Disk Pages with a Linked List"; ACM Transactions on Database Systems, vol. 8, No. 4, Dec. 1983, pp. 503-514 (12 pages).

Rosenblum, M. et al.; "The LFS Storage Manager" Computer Science Division, Electrical Engineering and Computer Sciences, University of California; presented at the Summer '90 USENIX Technical Conference, Anaheim, California, Jun. 1990 (16 pages).

Lorie, R. A.; "Physical Integrity in a Large Segmented Database"; ACM Transactions on Database Systems, vol. 2, No. 1, Mar. 1977, pp. 91-104 (14 pages).

Nievergelt, J.; "Binary Search Trees and File Organization"; Computing Surveys, vol. 6, No. 3, Sep. 1974; pp. 195-207 (13 pages).

Johnson, J. E. et al.; "Overview of the Spiralog File System", Digital Technical Journal, vol. 8, No. 2, 1996, pp. 5-14 (10 pages).

Santry, D. S. et al.; "Deciding When to Forget in the Elephant File System"; 17th ACM Symposium on Operating Systems Principles (SOSP '99), Dec. 1999; pp. 110-123 (14 pages).

Chutani, S. et al., "The Episode File System"; Proceedings of the 1992 USENIX Winter Technical Conference; 1992; (18 pages).

Seltzer, M.L.; "File System Performance and Transaction Support"; University of California at Berkeley, 1992 (131 pages).

Octavian Lascu et al, "Configuration and Tuning GPFS for Digital Media Environments", Nov. 2005, IBM International Technical Support Organization, p. 38. Available online: http://www.redbooks.ibm/com/redbooks/pdfs/sg246700.pdf.

"An Introduction to GPFS v1.3 for Linux", Jun. 2003. Available online: http://jumpdoc.fz-juelich.de/doc_pdf/gpfs21/ GPFs-Linux-wp060303.pdf.

Sanjay Ghemawat et al, "The Google File System", 2003, ACM, page 3.

* cited by examiner

ADAPTIVE RESILVERING I/O SCHEDULING

CROSS REFERENCE TO RELATED APPLICATIONS

This application claims benefit of U.S. Provisional Application Ser. No. 60/733,909 filed on Nov. 4, 2005, entitled "ADAPTIVE RESILVERING I/O SCHEDULING" in the names of William H. Moore and Jeffrey S. Bonwick and is hereby incorporated by reference.

The present application contains subject matter that may be related to the subject matter in the following U.S. patent applications, which are all assigned to a common assignee: "Method and Apparatus for I/O Scheduling" (application Ser. No. 10/923,633) filed on Aug. 20, 2004; "Method and Apparatus for File System Level I/O Queuing" (application Ser. No. 10/923,632) filed on Aug. 20, 2004; "Method and Apparatus for Quantized Deadline I/O Scheduling" (application Ser. No. 10/922,649) filed on Aug. 20, 2004; and "Method and System for I/O Scheduler Activations" (application Ser. No. 11/069,176) filed on Mar. 1, 2005.

BACKGROUND

With modern disk drives, there is a large performance (approx. 100:1 ratio) difference between issuing Input/Output (I/O) requests in a sequential order (with respect to physical location) on disk versus issuing I/O requests in a random order. The large difference in performance is predominately the result of two sources of latency, namely seek latency and rotational delay. Seek latency corresponds to the time required for the disk drive to move a physical read/write head to the location on the disk (i.e., the area on a platter in the disk drive) and the time required to allow for fine-tuning the exact position of the read/write head (commonly referred to as "head settling"). Rotational delay occurs when the read/write head is in the proper position, but the disk drive must wait for the desired sector to rotate underneath the read/write head.

The aforementioned latencies are typically measured in milliseconds. This is a very large amount of time when compared to the time increment used to quantify processing power of processors (e.g., nanoseconds, etc.), and these delays tend to dictate the performance available to a file system given an underlying disk drive.

Modern disk drives have two common mechanisms that help to minimize the aforementioned sources of latency: tagged queuing and time-of-flight I/O scheduling. Tagged queuing allows the disk drive to accept multiple outstanding I/O requests that the disk drive may then service concurrently in any order that the disk drive chooses. Time-of-flight I/O scheduling allows the disk drive to use detailed knowledge about the disk drive geometry and other physical characteristics to potentially service other I/O requests while waiting out the rotational delay for a desired block.

For example, consider a disk drive (implementing the aforementioned mechanisms) has just completed servicing an I/O request for block 1000. The next I/O request that needs to be serviced is block 1500, which is located on the same track as block 1000, but 270 degrees of rotation away. While the disk drive is waiting for the disk to rotate around to block 1500, the disk drive analyzes the other outstanding I/O requests and determines that blocks 250 and 2750, which are located on adjacent tracks, may be serviced while still allowing time for the read/write head to seek back to the track for block 1500 in time to read the block 1500 as it passes under the read/write head.

SUMMARY

In general, in one aspect, the invention relates to method for storing data, comprising receiving an Input/Output (I/O) request to store data in a storage pool, determining whether the I/O request is a resilvering I/O request, if the I/O request is a resilvering I/O request: associating the I/O request with a first deadline, wherein the first deadline is associated with a low priority, a dn determining the quantized deadline for the I/O request using the first deadline. If the I/O request is not the resilvering I/O request, then associating the I/O request with a second deadline, determining the quantized deadline for the I/O request using the second deadline, placing the I/O request in the I/O queue using the quantized deadline, and issuing the I/O request to the storage pool using the I/O queue.

In general, in one aspect, the invention relates to a system for storing data, comprising a storage pool configured to store data, an Input/Output (I/O) queue configured to store an I/O request to store data, and a file system configured to: receive the I/O request to store data in a storage pool, determine whether the I/O request is a resilvering request, if the I/O request is a resilvering request: associate the I/O request with a first deadline, wherein the first deadline is associated with a low priority, determine the quantized deadline for the I/O request using the first deadline, if the I/O request is not the resilvering request: associate the I/O request with a second deadline, determine the quantized deadline for the I/O request using the second deadline, place the I/O request in an I/O queue using the quantized deadline, and issue the I/O request to the storage pool using the I/O queue.

In general, in one aspect, the invention relates to plurality of nodes, comprising: a storage pool configured to store data, an Input/Output (I/O) queue configured to store an I/O request to store data, and a file system configured to: receive the I/O request to store data in a storage pool, determine whether the I/O request is a resilvering request, if the I/O request is a resilvering request: associate the I/O request with a first deadline, wherein the first deadline is associated with a low priority, determine the quantized deadline for the I/O request using the first deadline, if the I/O request is not the resilvering request: associate the I/O request with a second deadline, determine the quantized deadline for the I/O request using the second deadline, place the I/O request in an I/O queue using the quantized deadline, and issue the I/O request to the storage pool using the I/O queue, wherein the storage pool is located on at least one of the plurality of nodes, wherein the I/O queue is located on at least one of the plurality of nodes, and wherein the file system is located on at least one of the plurality of nodes.

Other aspects of the invention will be apparent from the following description and the appended claims.

DETAILED DESCRIPTION

Figure 1:
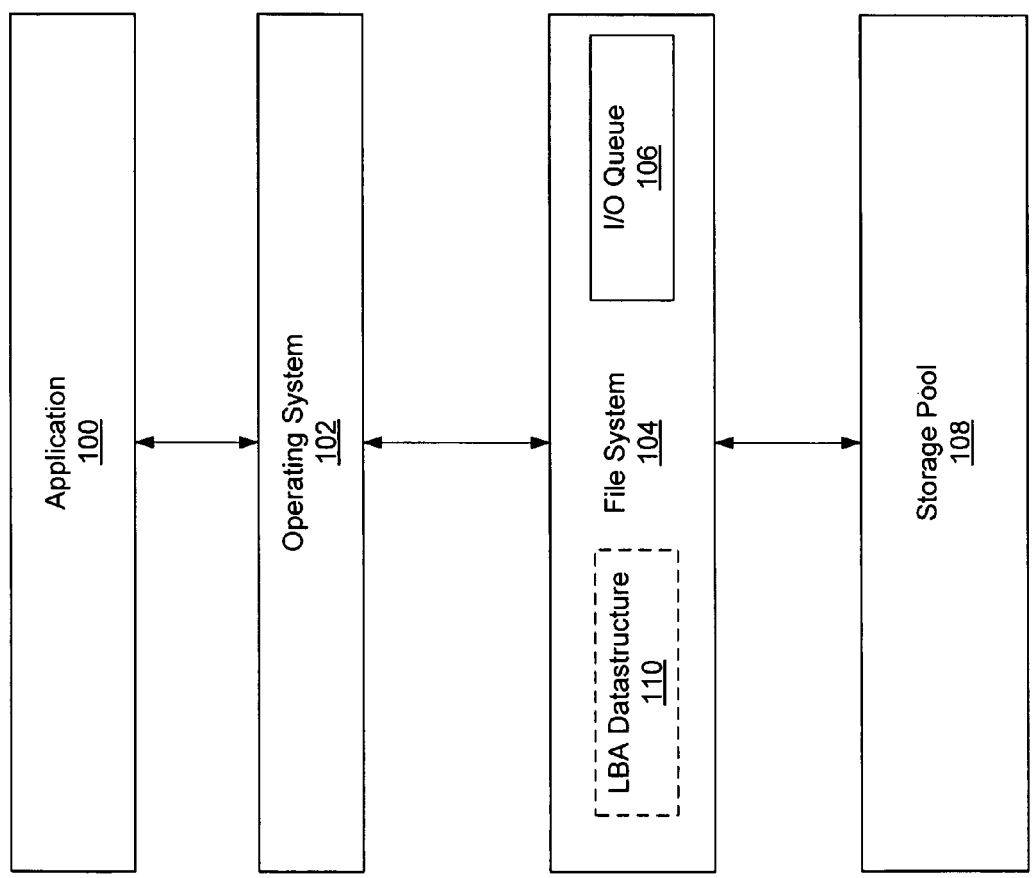
FIG. 1 shows a system architecture in accordance with one embodiment of the invention.

Exemplary embodiments of the invention will be described with reference to the accompanying drawings. Like items in the drawings are shown with the same reference numbers.

In the following description, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention provide a method and apparatus for issuing I/O requests from applications, operating systems, etc. as well as resilvering I/O requests to a storage pool using a file system I/O queue and, in some embodiments of the invention, a logical block address (LBA) data structure. Further, embodiments of the invention provide a method and apparatus to schedule I/O requests at the file system level and at the same time leverage the tagged queuing and time-of-flight scheduling. Using one or more embodiments of the invention, the resilvering I/O requests are intermingled with I/O requests related to the normal operating of the file system, operating system, and/or applications.

In one embodiment of the invention, a resilvering I/O request corresponds to an I/O request that is related to the resilvering of one or more disks in a storage pool. Resilvering is typically required when data stored on a first disk in the storage pool is not synchronized with the corresponds data on a second disk in the storage pool. For example, resilvering is required when at least one disk in the mirror array (i.e., the disks involved in the mirror) fails such that data (or metadata) is written to one disk but a corresponding copy of the data is not written to one of the corresponding mirrors.

For example, if the file system uses 3-way mirroring (i.e., there are two additional copies of the data (or metadata) in the storage pool) and file A is to be written to the storage pool, then three I/O requests are issued (i.e., an I/O request to write file A to disk 1, an I/O request to write file A to disk 2, and an I/O request to write file A to disk 3). If file A is successfully written to disk 1 and disk 2, but disk 3 fails before and/or during the writing of file A, then disk 3 will have to be resilvered. Specifically, a resilvering I/O request is issued to disk 3, where the resilvering I/O request writes file A to disk 3.

Those skilled in the art will appreciate that embodiments of the invention may use any method of determining whether to issue resilvering I/O requests. One method for determining whether to issue resilvering I/O requests is to use dirty region logging. As an alternative, dirty time logging (DTL) may be used. DTL is described in Provisional Application Ser. No. 60/733,909, entitled "DTL and Resilvering" filed on Nov. 4, 2005, and is hereby incorporated reference.

Those skilled in the art will also appreciate that resilvering I/O requests may also be used to resilver one or more disks in the storage pool, where the data (or metadata) is stored in the storage pool using a Redundant Array of Inexpensive Disks (RAID) scheme. If the data (or metadata) is stored using a RAID scheme, then resilvering the disk corresponds to first reconstructing the data (or metadata) in accordance with the RAID scheme and then issuing a resilvering I/O to write the reconstructed data (or metadata) to the appropriate disk in the storage pool.

FIG. 1 shows a system architecture in accordance with one embodiment of the invention. The system architecture includes an application (100) interfacing with an operating system (102). Further, the operating system (102) includes functionality to interact with a file system (104), which in turn interfaces with a storage pool (108). The operating system (102) typically interfaces with the file system (104) via a system call interface (not shown). The operating system (102) provides operations for users to access files within the file system (104). These operations may include read, write, open, close, etc. In one embodiment of the invention, the file system (104) is an object-based file system (i.e., both data and metadata are stored as objects). More specifically, the file system (104) includes functionality to store both data and corresponding metadata in the storage pool (108). Thus, the aforementioned operations provided by the operating system (102) correspond to operations on objects.

More specifically, in one embodiment of the invention, a request to perform a particular operation (i.e., a transaction) is forwarded from the operating system (102), via the system call interface, to the file system (104). In one embodiment of the invention, the file system (104) translates the request to perform an operation on an object directly to a request to perform a read or write operation (i.e., an I/O request) at a physical location within the storage pool (108). Further, the file system (104) includes functionality to write the data into the storage pool (108).

In accordance with one embodiment of the invention, file system (104) may include an I/O management module (not shown), a compression module (not shown), an encryption module (not shown), a checksum module (not shown), and a metaslab allocator (not shown). Each of these aforementioned modules may be used by the file system (104) to read data from and/or write data to the storage pool (108). Each of the aforementioned modules is detailed below.

In one embodiment of the invention, the I/O management module (not shown) receives I/O requests and groups the I/O requests into transaction groups. The compression module (not shown) provides functionality to compress larger logical blocks into smaller segments, where a segment is a region of physical disk space. Further, in one embodiment of the invention, the encryption module (not shown) provides various data encryption algorithms. The data encryption algorithms may be used, for example, to prevent unauthorized access. In one embodiment of the invention, the checksum module (not shown) includes functionality to calculate a checksum for data and metadata within the storage pool. The checksum may be used, for example, to ensure data has not been corrupted. As discussed above, the file system (104) provides an interface to the storage pool (108) and manages allocation of storage space within the storage pool (108). More specifically, in one embodiment of the invention, the file system (104) uses the metaslab allocator (not shown) to manage the allocation of storage space in the storage pool (108).

In one embodiment of the invention, the storage pool (108) includes one or more physical disks. Further, in one embodiment of the invention, the storage capacity of the storage pool (108) may increase and decrease dynamically as physical disks are added and removed from the storage pool.

In one embodiment of the invention, the file system (104) includes at least one I/O queue (106). Each I/O queue (e.g., I/O queue (106)) is associated with a physical disk in the storage pool (108). Each I/O queue (e.g., I/O queue (106)) typically holds the I/O requests for a particular physical disk within the storage pool (108). Alternatively, there may be one I/O queue (106) for the entire storage pool (108) (or for a portion of the storage pool (108)). In one embodiment of the invention, the file system (104) includes functionality to order the I/O requests in each of the I/O queues (e.g., I/O queue (106)). Further, the file system (104) may include functionality to order the I/O requests using a quantized deadline (described below in FIG. 4) associated with the I/O request and a logical block address (LBA) associated with the I/O request. The ordering of the I/O requests within the I/O queue (106) is described in FIG. 4 below.

In one embodiment of the invention, the file system (104) may also include a LBA data structure (110). The LBA data structure (110) includes functionality to store the I/O requests in LBA order. In one embodiment of the invention, the LBA data structure (110) is implemented as an AVL tree. Alternatively, the LBA data structure (110) may be implemented using any other suitable data structure (e.g., an array, a linked list, a hash table, etc.). Further, the file system (104) may include functionality to insert I/O requests into the LBA data structure (110) and functionality to retrieve I/O requests using LBAs.

In one embodiment of the invention, a process executing on the file system (105), a process executing on the operating system (102), or the application (100) may issue resilvering I/O requests to the file system (104). Those skilled in the art will appreciate that the process or application which issues the resilvering I/O request may also include functionality to determine which data in the storage pool needs to be resilvered using the methods referenced above.

Figure 2:
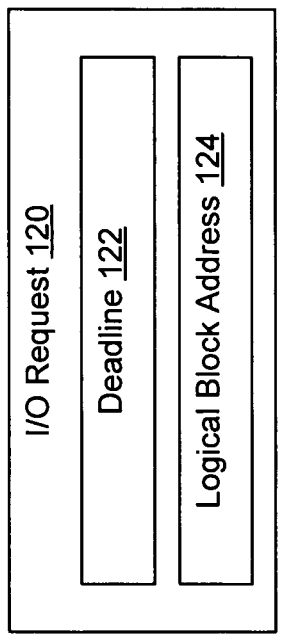
FIG. 2 shows an I/O request in accordance with one embodiment of the invention.

FIG. 2 shows an I/O request in accordance with one embodiment of the invention. The I/O request (120) includes a deadline (122) and a logical block address (LBA) (124). The deadline (122) may correspond to an actual deadline (e.g., a time by which a the I/O request must be issued, or a time frame during which the I/O request must be issued). Alternatively, the deadline (122) may correspond to priority such as: high priority (i.e., complete as soon as possible—may be used with I/O requests from real-time applications as well as synchronous requests), medium priority (i.e., complete soon, but not necessarily immediately—may be used with high priority asynchronous requests), or low priority (i.e., complete eventually—may be used with low priority asynchronous requests). In one embodiment of the invention, the LBA (124) is an n-bit value that maps to a specific location on the physical disk.

Though not shown in FIG. 2, the I/O request (120) includes information and/or is associated with information necessary to determine whether the I/O request is a resilvering I/O request. In one embodiment of the invention, the file system may determine that the I/O request is a resilvering I/O request based on the origin of the I/O request. Alternatively, each I/O request may include type information specifying the type of request (e.g., resilvering I/O request, I/O request other than a resilvering I/O request, etc.)

Figure 3:
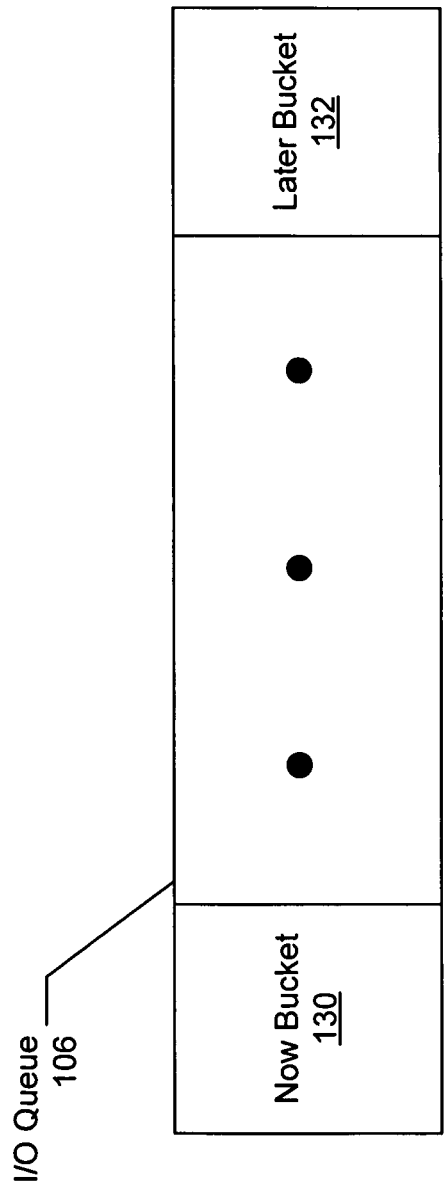
FIG. 3 shows an I/O queue in accordance with one embodiment of the invention.

FIG. 3 shows an I/O queue in accordance with one embodiment of the invention. The I/O queue (106) may include a number of buckets (e.g., a "now" bucket (130) and a "later" bucket (132)). In one embodiment of the invention, each bucket (e.g., the "now" bucket (130) and the "later" bucket (132)) corresponds to a particular quantized deadline (described below in FIG. 4). Thus, all I/O requests with a given quantized deadline are stored in a particular bucket. Further, the I/O requests within an individual bucket (e.g., the "now" bucket (130) and the "later" bucket (132)) are ordered with respect to LBA (124 in FIG. 2).

In one embodiment of the invention, the I/O queue (106) is implemented as an AVL (Adelson Velskii Landis) tree. The AVL tree corresponds to a partially-balanced binary tree. In one embodiment of the invention, the nodes (i.e., the I/O requests) within the AVL tree are ordered using the quantized deadline and LBA corresponding to the nodes. If an AVL tree is used to implement the I/O queue (106), then the buckets (e.g., the "now" bucket (130), the "later" bucket (132)) correspond to portions of the AVL tree. In another embodiment of the invention, the I/O queue (106) is implemented as a hash table having hash buckets. Those skilled in the art will appreciate that the I/O queue (106) may be implemented using any data structure that can maintain the order of the I/O requests.

Figure 4:
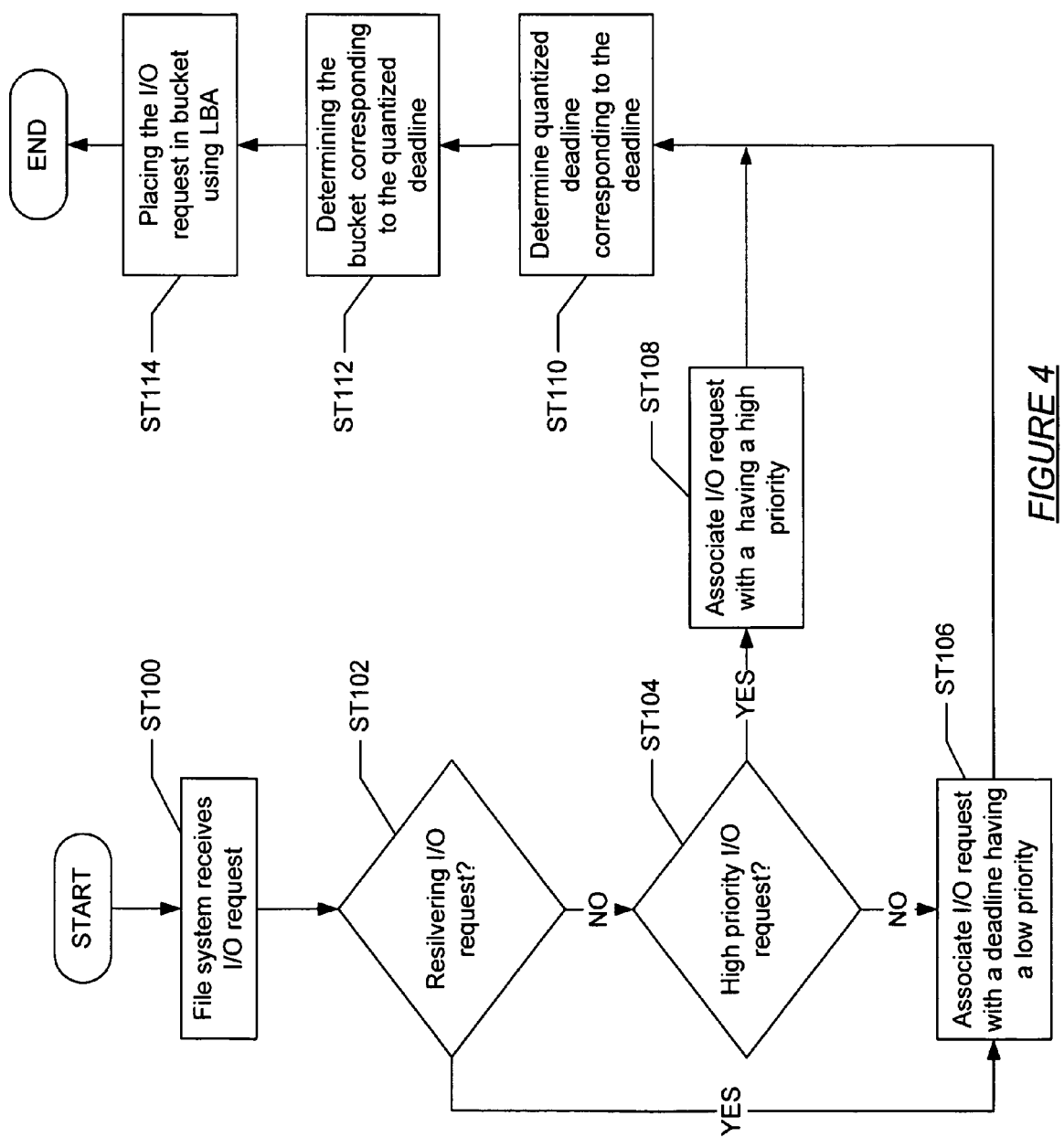
FIGS. 4-6 show flowcharts in accordance with one embodiment of the invention.
Figure 5:
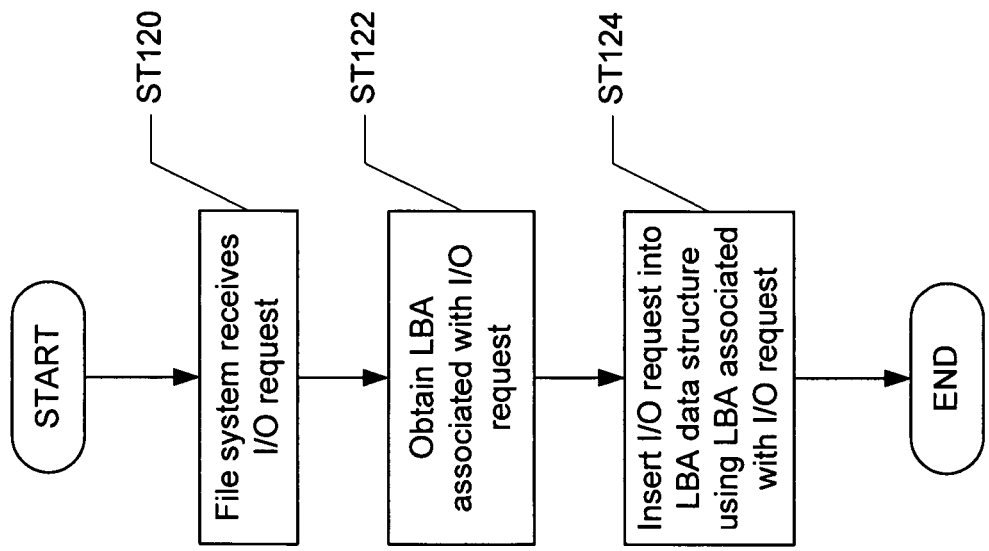
Figure 6:
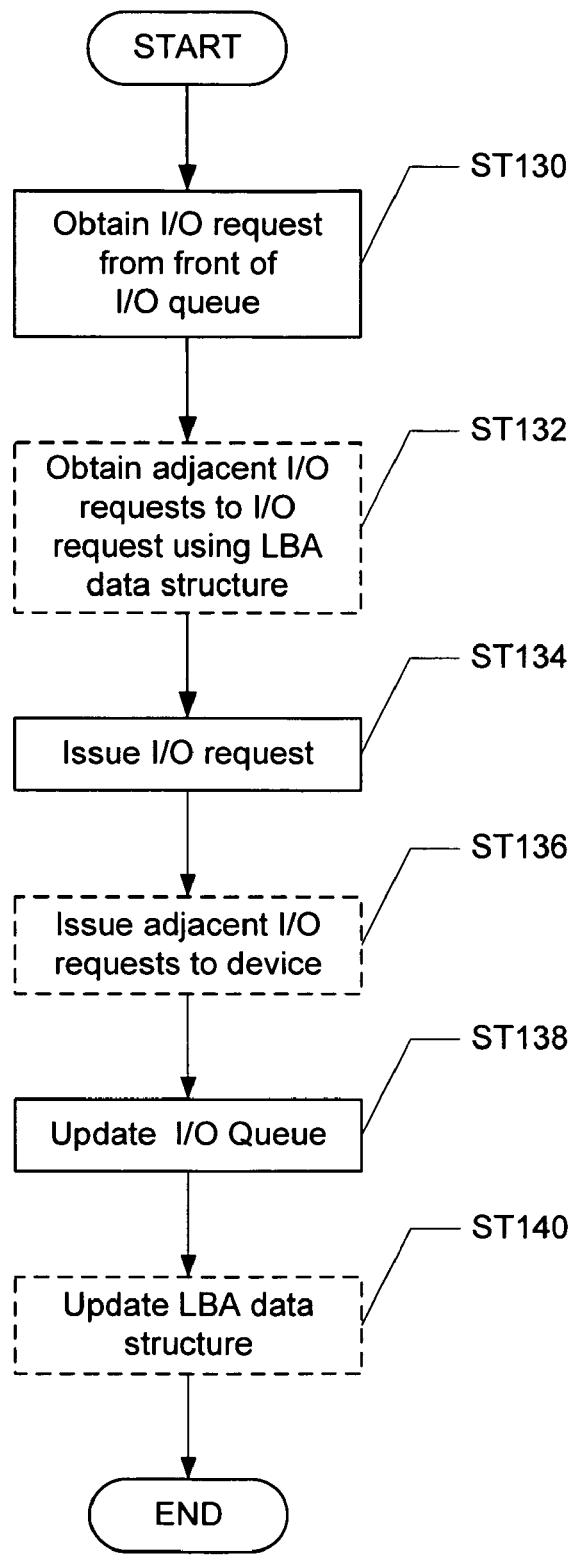

FIGS. 4, 5, and 6 show flowcharts in accordance with one embodiment of the invention. FIG. 4 shows a flowchart for placing an I/O request in an I/O queue in accordance with one embodiment of the invention. Initially, an I/O request is received by the file system (ST100). A determination is then made about whether the I/O request is a resilvering I/O request (ST102). If the I/O request is a resilvering I/O request, then the I/O request is associated with a deadline having a low priority (ST106).

If the I/O request is not a resilvering I/O request, then a determination is made about whether the I/O request is a high priority I/O request (ST104). If the I/O request is a high priority I/O request, then the I/O request is associated with a deadline having a high priority (ST108). Alternatively, if the I/O request is not a high priority I/O request, then the I/O request is associated with a deadline having a low priority (ST106). As an alternative to ST102-108, those skilled in the art will appreciate that the process and/or application issuing the I/O request (either a resilvering I/O request or a non-resilvering I/O request) may set the deadline prior to sending the request to the file system. In such cases, any process issuing a resilvering I/O request sets the deadline such that the resilvering request is processed at the lowest priority.

Continuing with the discussion of FIG. 4, a quantized deadline is subsequently determined for the I/O request using the deadline (ST110). In one embodiment of the invention, a quantized deadline corresponds to a period of time when a particular request is to be performed. The quantized deadline is used to coarsely order the I/O request in the I/O queue. In one embodiment of the invention, the quantized deadlines are set in millisecond intervals.

For example, consider the following quantized deadlines: now (0-99 ms), soon (100-199 ms), and later (199 ms+). Thus, when an I/O request having a deadline of 75 ms is received, then the quantized deadline for the I/O request is considered "now". Note that the quantized deadlines may be set using any magnitude (e.g., seconds, milliseconds, nanoseconds, etc.) and any duration of time interval. Further, the quantized deadlines may be identified using any type of label. In one embodiment of the invention, the intervals of the quantized deadlines may be adjusted such that the buckets corresponding to the quantized deadline contain only (or slightly more than) the number of I/O requests that may be processed prior to the I/O requests in the bucket expiring.

Once the quantized deadline for the I/O request is determined, the bucket corresponding to the quantized deadline is determined (ST112). In one embodiment of the invention, if the I/O queue is implemented as an AVL tree, then determining the bucket corresponding to the quantized deadline includes identifying the portion of the AVL tree that corresponds to the bucket. Alternatively, if the I/O queue is implemented as a hash table having hash buckets, then determining the bucket corresponding to the quantized deadline includes identifying the appropriate hash bucket.

Once the corresponding bucket is determined, the I/O request is placed in the bucket in an order determined by the LBA of the I/O request (ST114). In one embodiment of the invention, the LBA of the I/O request that is being inserted into the I/O queue is compared with the LBAs of the I/O requests already in the bucket, and then inserted into the appropriate location within the bucket. The insertion of the I/O request into the I/O queue includes inserting the I/O request into the appropriate location in the data structure implementing the I/O queue (e.g., a linked list, an array, an AVL tree, etc).

FIG. 5 shows a flowchart for placing an I/O request in a LBA data structure. Initially, the file system receives the I/O request (ST120). The LBA of the I/O request is subsequently obtained (ST122). The file system (or a related process) subsequently inserts a copy of the I/O request into the LBA data structure in the appropriate location using the LBA of the I/O request (ST124).

If the embodiment shown in FIG. 5 is implemented, then the methods shown in FIGS. 4 and 5 are both performed every time an I/O request is received by the file system. Further, the method shown in FIGS. 4 and 5 may be performed sequentially or concurrently when the I/O request is received. Upon the completion of the methods shown in FIGS. 4 and 5, a copy of the I/O request is present in both the I/O queue and the LBA data structure.

FIG. 6 shows a flowchart for processing the I/O request in the I/O queue in accordance with one embodiment of the invention. Initially, the highest priority I/O request is obtained from the I/O queue (ST130). In one embodiment of the invention, the highest priority request corresponds to the I/O request in the "now" bucket with the highest priority based on LBA. If the I/O queue is implemented as an AVL tree, then the highest priority I/O request is the I/O request at the left-most leaf of the AVL tree.

Once the highest priority I/O request is obtained, optionally, the LBA of the high priority request is used to obtain one or more adjacent I/O requests (ST132). In one embodiment of the invention, the adjacent I/O requests correspond I/O requests that may be serviced (without any delay or minimal delay) while the disk is rotating from the current location to the location necessary to process the highest priority I/O request. For example, if the disk needs to rotate 180 degrees from its current location to service the highest priority I/O request, then the file system may issue additional I/O requests that are in the path between the current location of the read/write head and the location of the read/write head required to service the highest priority I/O request. Those skilled in the art will appreciate that an I/O request may be considered on the path even if the I/O request requires the read/write head to switch tracks in order to service the request.

In one embodiment of the invention, adjacent I/O requests may be determined by obtaining I/O requests that have LBAs within a few megabytes (e.g., one megabyte) of the LBA of the highest priority I/O request. The adjacent I/O requests are obtained using the LBA data structure (in which I/O requests are ordered with respect to LBA) and the LBA of the highest priority I/O request. In one embodiment of the invention, the LBA interval to find adjacent I/O requests is set to an interval that allows the disk to leverage time-of-flight scheduling.

Once the highest priority I/O request has been determined, the highest priority I/O request is issued to the appropriate storage device (e.g., physical disks) (ST124). If ST132 is implemented, then the adjacent I/O requests are also issued to the appropriate storage device (e.g., physical disks) (ST126). Once the highest priority I/O request has been issued to disk, the highest priority I/O request is removed from the I/O queue (ST138). Additionally, if ST136 is implemented, then any adjacent I/O requests that were issued to disk are also removed from the I/O queue. Further, if ST132 is implemented, then the LBA data structure is also updated to remove the highest priority I/O request and the adjacent I/O requests that were issued to disk (ST140).

In one embodiment of the invention, the I/O queue is updated by moving one or more I/O requests from a bucket at the back of the I/O queue to a bucket closer to the front of the I/O queue (e.g., from the "later" bucket to the "now" bucket). Alternatively, if the I/O queue is implemented as an AVL tree, then I/O queue is updated by rebalancing the AVL tree. The LBA data structure is updated in a similar manner.

Those skilled in the art will appreciate that methods described in FIGS. 4, 5, and 6 may occur concurrently within the system. As such, when new I/O requests are received by the file system, the file system places the I/O request in the I/O queue and the LBA data structure (if this embodiment is implemented), thereby reordering the I/O queue and the LBA data structure (if this embodiment is implemented). As noted above, the intervals of the quantized deadlines may be adjusted such that the buckets corresponding to the quantized deadline contain only (or slightly more than) the number of I/O requests that may be processed prior to the expiration of the deadlines of the I/O requests in the bucket.

However, in some situations, all of the I/O requests in the bucket may not be able to be processed prior to the expiration of the deadlines of the I/O requests. In such situations, in order to ensure that the I/O requests with expired deadlines are not preempted by other newly arriving high priority I/O requests, the unprocessed I/O requests (typically unprocessed I/O requests from the "now" bucket) are placed in an "immediate" bucket. The "immediate" bucket (not shown in FIG. 3) corresponds to a bucket that has a higher priority than the "now" bucket. Further, an I/O request may not be initially placed in the "immediate" bucket, rather, the I/O request may only move to the "immediate" bucket if the I/O request was previously in the "now" bucket and unprocessed while the I/O request's deadline expired. Further, when new I/O requests are received by the file system, the new I/O requests may only be placed in buckets with less priority than the "immediate" bucket (i.e., in the "now" bucket, the "later" bucket, etc.). In this manner, the I/O requests with expired deadlines are processed.

Those skilled in the art will appreciate that while the aforementioned discussion of embodiments of the invention described a file system that functions without a volume manager, the invention may be implemented on a system architecture with a volume manager. Those skilled in the art will appreciate that while the above discussion of the embodiments of the invention used LBA to order the I/O requests within the corresponding buckets, the I/O request may be ordered using any criteria that minimizes latency or satisfies other performance requirements. The criteria may include information about disk geometry, other characteristics of the disk, etc.

Figure 7:
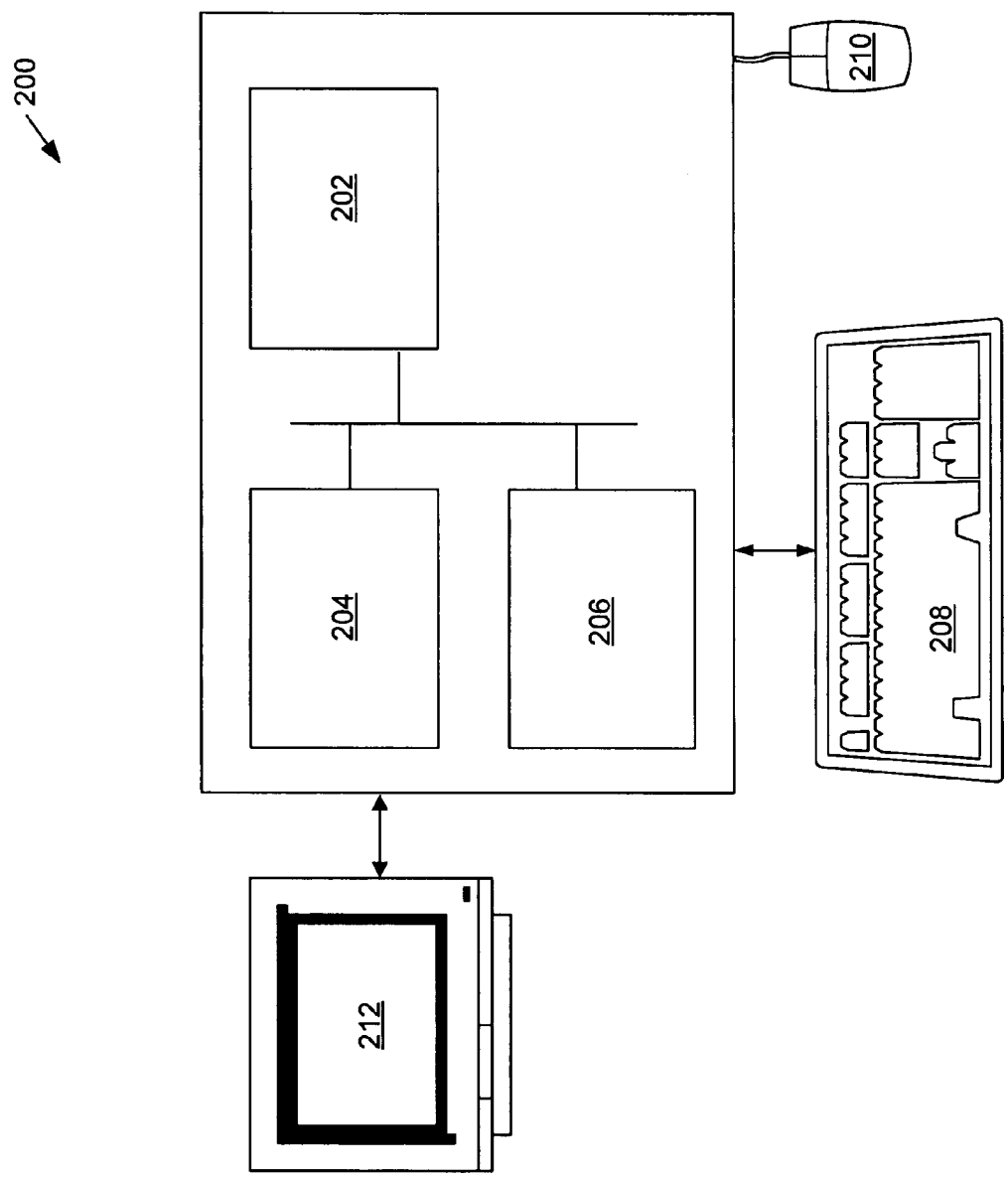
FIG. 7 shows a computer system in accordance with one embodiment of the invention.

The invention may be implemented on virtually any type of computer regardless of the platform being used. For example, as shown in FIG. 7, a computer system (200) includes a processor (202), associated memory (204), a storage device (206), and numerous other elements and functionalities typical of today's computers (not shown). The computer (200) may also include input means, such as a keyboard (208) and a mouse (210), and output means, such as a monitor (212). The computer system (200) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (200) may be located at a remote location and connected to the other elements over a network. Further, the invention may be implemented on a distributed system having a plurality of nodes, where each portion of the invention (e.g., file system, the storage pool, etc.) may be located on a different node within the distributed system. In one embodiment of the invention, the node corresponds to a computer system. Alternatively, the node may correspond to a processor with associated physical memory. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for storing data, comprising:
   receiving a plurality of Input/Output I/O requests to store data in a storage pool, wherein the plurality of I/O requests comprises at least one resilvering I/O request and at least one normal I/O request;
   determining whether each I/O request of the plurality of I/O requests is a resilvering I/O request;
   determining whether a first deadline associated with each I/O request of the plurality of I/O requests is expired;
   for each I/O request of the plurality of I/O requests:
      if the first deadline is expired:
         placing the I/O request in an immediate I/O queue;
      if the I/O request is the resilvering I/O request:
         associating the I/O request with a second deadline, wherein the second deadline is associated with a low priority;
         determining a first quantized deadline for the I/O request using the second deadline; and
         ordering the I/O request in an I/O queue based on the first quantized deadline;
      if the I/O request is not the resilvering I/O request:
         associating the I/O request with a third deadline;
         determining a second quantized deadline for the I/O request using the third deadline; and
         ordering the I/O request in the I/O queue based on the second quantized deadline;
   issuing each of the I/O requests in the immediate I/O queue to the storage pool; and issuing each of the I/O requests in the I/O queue to the storage pool.

2. The method of claim 1, further comprising:
   updating the I/O queue after the I/O request has been issued to the storage pool.

3. The method of claim 1, wherein the I/O queue comprises a plurality of buckets.

4. The method of claim 3, wherein placing the I/O request in the I/O queue comprises placing the I/O request in one of the plurality of buckets based on a corresponding quantized deadline.

5. The method of claim 3, wherein the plurality of buckets comprises a "now" bucket and a "later" bucket.

6. The method of claim 5, wherein the I/O request is issued when the request is a highest priority I/O request in the "now" bucket.

7. The method of claim 5, wherein the I/O request moves from the "later" bucket to the "now" bucket after a pre-defined amount of time has elapsed.

8. The method of claim 1, wherein the third deadline is associated with one selected from the group consisting of the low priority and a high priority.

9. The method of claim 1, wherein the I/O queue is associated with the file system.

10. A system for storing data, comprising:
    a storage pool configured to store data;
    an Input/Output (I/O) queue configured to store a plurality of I/O requests to store data, wherein the plurality of I/O requests comprises at least one resilvering I/O request and at least one normal I/O request;
    an immediate I/O queue configured to store I/O requests of the plurality of I/O requests for immediate processing; and
    a file system configured to:
       receive the plurality of I/O requests to store data in a storage pool;
       determine whether each of the plurality of I/O requests is a resilvering request;
       determine whether a first deadline associated with each I/O request of the plurality of I/O requests is expired;
       for each I/O request of the plurality of I/O requests:
          if the first deadline is expired:
             place the I/O request in the immediate I/O Queue;
          if the I/O request is a resilvering request:
             associate the I/O request with a second deadline, wherein the second deadline is associated with a low priority;
             determine a first quantized deadline for the I/O request using the second deadline; and
             order the I/O request in an I/O queue based on the first quantized deadline;
          if the I/O request is not the resilvering request:
             associate the I/O request with a third deadline;
             determine a second quantized deadline for the I/O request using the third deadline;
             order the I/O request in the I/O queue based on the second quantized deadline;
       issue each of the I/O requests in the immediate I/O queue to the storage pool; and
       issue each of the I/O requests in the I/O queue to the storage pool.

11. The system of claim 10, further comprising:
    a logical block address data structure configured to store the I/O request and an adjacent I/O request.

12. The system of claim 11, wherein the I/O queue is further configured to store the adjacent I/O request to store data in the storage pool.

13. The system of claim 12, wherein the file system is further configured to:
    place a copy of the I/O request in the logical block address data structure using a logical block address corresponding to the copy of the I/O request; and
    issue the adjacent I/O request to the storage pool using the logical block address data structure, wherein the adjacent I/O request is determined using the logical block address of the copy of the I/O request.

14. The system of claim 10, wherein the third deadline is associated with one selected from the group consisting of the low priority and a high priority.

15. A plurality of nodes, comprising:
    a storage pool configured to store data;
    an Input/Output (I/O) queue configured to store a plurality of I/O requests to store data, wherein the plurality of I/O requests comprises at least one resilvering I/O request and at least one normal I/O request; and an immediate I/O queue configured to store I/O requests of the plurality of I/O requests for immediate processing; and a file system configured to:
    receive the plurality of I/O requests to store data in a storage pool;
    determine whether each of the plurality of I/O requests is a resilvering request;
    determine whether a first deadline associated with each I/O request of the plurality of I/O requests is expired;
    for each I/O request of the plurality of I/O requests:
        if the first deadline is expired:
            place the I/O request in the immediate I/O queue;
        if the I/O request is a resilvering request:
            associate the I/O request with a second deadline, wherein the second deadline is associated with a low priority;
            determine a first quantized deadline for the I/O request using the second deadline; and
            order the I/O request in an I/O queue based on the first quantized deadline;
        if the I/O request is not the resilvering request:
            associate the I/O request with a third deadline;
            determine a second quantized deadline for the I/O request using the third deadline;
            order the I/O request in the I/O queue based on the second quantized deadline;
    issue each of the I/O requests in the immediate I/O queue to the storage pool; and
    issue the I/O request to the storage pool using the I/O queue, wherein the storage pool is located on at least one of the plurality of nodes, wherein the I/O queue is located on at least one of the plurality of nodes, and wherein the immediate I/O queue is located on at least one of the plurality of nodes, and wherein the file system is located on at least one of the plurality of nodes.

* * * * *